US012124438B1

(12) United States Patent
Schmidt (10) Patent No.: US 12,124,438 B1
(45) Date of Patent: Oct. 22, 2024

(54) SEARCH QUERIES MATCHING SYSTEM (71) Applicant: S&P Global Inc., New York, NY (US)

(72) Inventor: Craig William Schmidt, Wellesley, MA (US)

(73) Assignee: S&P Gloal Inc., New York, NY (US)

( * ) Notice: Subject to any disclaimer, the term of this patent is extended or adjusted under 35 U.S.C. 154(b) by 0 days.

(21) Appl. No.: 18/334,842

(22) Filed: Jun. 14, 2023

(51) Int. Cl.
*G06F 16/00* (2019.01)
*G06F 16/242* (2019.01)
*G06F 16/2455* (2019.01)

(52) U.S. Cl.
CPC ...... *G06F 16/243* (2019.01); *G06F 16/24553* (2019.01)

(58) Field of Classification Search
CPC .. G06F 40/129; G06F 16/3322; G06F 40/247; G06F 16/3338; G06F 16/374; G06F 40/237; G06F 16/3325; G06F 16/90324; G06F 40/58; G06T 9/005; H04N 19/13; H04N 19/91; H04N 19/93; H03M 7/3086; H03M 7/3088; H03M 9/00; H03M 11/00; Y10S 707/99933
See application file for complete search history.

(56) References Cited

U.S. PATENT DOCUMENTS

| | | | |
|---|---|---|---|
| 8,037,086 B1 * | 10/2011 | Upstill | G06F 16/374 704/10 |
| 9,594,850 B2 | 3/2017 | Donneau-Golencer | |
| 11,514,096 B2 | 11/2022 | Psota et al. | |
| 2005/0209844 A1 * | 9/2005 | Wu | G06F 40/129 704/2 |

OTHER PUBLICATIONS

"Fuzzy String Comparison—Detecting shorthand names," available at https://stackoverflow.com/questions/10161770/fuzzy-string-comparison-detecting-shorthand-names, accessed on Jun. 14, 2023, 2 pages.

* cited by examiner

*Primary Examiner* — Shyue Jiunn Hwa
(74) *Attorney, Agent, or Firm* — Yee & Associates, P.C.

(57) ABSTRACT

A computer implemented method for managing search queries. The method uses a number of processor units to receive data records. The number of processor units identify a set of data record pairs from the data records. The number of processor units generates a list of long data records based on frequencies of occurrences for long data records associated with each short data record in the set of data record pairs. The number of processor units receive a search query comprises a number of short data records in the set of data record pairs. The number of processor units identify a number of long data records for each short data record in the number of short data records using the lists of long data records for short data records. The number of processor units expand the search query by adding the number of long data records to the search query.

27 Claims, 8 Drawing Sheets

SEARCH QUERIES MATCHING SYSTEM

BACKGROUND INFORMATION

1. Field

The present disclosure relates generally to an improved computing system, and more specifically to a method of managing search queries to identify matching data records for the search queries in an information retrieval system.

2. Background

Search queries are a set of words or phrases that can be used in a database to retrieve relevant information or records. Search queries are important components of the search process for identifying and retrieving relevant data from large and complex datasets.

Search queries have become an essential tool for individuals and organizations to access information available on the internet and in databases. Effective use of search queries allows the search process to find relevant information in a quick and efficient manner, therefore saving time and resources.

However, matching search queries to desired results can be challenging due to factors such as misspelled search terms and varying data formats.

Therefore, it would be desirable to have a method and apparatus that take into account at least some of the issues discussed above, as well as other possible issues.

SUMMARY

An illustrative embodiment provides a computer implemented method for managing search queries. The method comprises receiving data records, wherein each data record in the data records comprises a sequence of characters for a phrase. Identifying a set of data record pairs from the data records, wherein each data record pair in the set of data record pairs comprises a long data record and a short data record that share a number of common characters with the long data record, and wherein the long data record comprises more characters than the short data record. Generating list of long data records for each short data record in the set of data record pairs based on frequencies of occurrences for long data records associated with each short data record in the set of data record pairs. Receiving a search query comprises a number of short data records in the set of data record pairs. Identifying number of long data records for each short data record in the number of short data records using the lists of long data records for short data records. Expanding the search query by adding the number of long data records to the search query.

Another illustrative embodiment provides a system for managing search queries. The system comprises a storage device configured to store program instructions and a number of processor units in communication with the storage device, wherein the number of processor units executes program instructions to: receive data records, wherein each data record in the data records comprises a sequence of characters for a phrase; identify a set of data record pairs from the data records, wherein each data record pair in the set of data record pairs comprises a long data record and a short data record that share a number of common characters with the long data record, and wherein the long data record comprises more characters than the short data record; generate a list of long data records for each short data record in the set of data record pairs based on frequencies of occurrences for long data records associated with each short data record in the set of data record pairs; receive a search query comprises a number of short data records in the set of data record pairs; identify a number of long data records for each short data record in the number of short data records using the lists of long data records for short data records; and expand the search query by adding the number of long data records to the search query.

Another illustrative embodiment provides a computer program product for managing search queries. The computer program product comprises a computer readable storage medium having program instructions embodied thereon to perform the steps of: receiving data records, wherein each data record in the data records comprises a sequence of characters for a name; identifying a set of data record pairs from the data records, wherein each data record pair in the set of data record pairs comprises a long data record and a short data record that share a number of common characters with the long data record, and wherein the long data record comprises more characters than the short data record; generating a list of long data records for each short data record in the set of data record pairs based on frequencies of occurrences for long data records associated with each short data record in the set of data record pairs; receiving a search query comprises a number of short data records in the set of data record pairs; identifying a number of long data records for each short data record in the number of short data records using the lists of long data records for short data records; and expanding the search query by adding the number of long data records to the search query.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristics of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations as described herein. For example, the illustrative embodiments recognize and take into account that it is difficult to match search queries to data records in a database because the search terms used in the search queries do not always match the exact words or phrases in the database.

The illustrative embodiments also recognize and take into account that it is difficult to match search queries to data records when searching through large amounts of data records that can include numerous irrelevant or duplicate results. Thus, illustrative embodiments provide a method, apparatus, system, and computer program product for managing search queries. In one illustrative example, a computer implemented method manages data records to expand a search query. A computer system receives data records and identifies a set of data record pairs from the data records, wherein each data record pair in the set of data record pairs comprises a long data record and a short data record that share common characters with the long data record. The computer system generates a list of long data records for each short data record in the set of data record pairs based on frequencies of occurrences for long data records associated with each short data record in the set of data record pairs. The computer system receives a search query comprises a number of short data records in the set of data record pairs. The computer system identifies long data records for each short data record in the number of short data records using the lists of long data records for short data records and expands the search query by adding the number of long data records to the search query. A computer system and a computer program product for managing data records to expand a search query are provided. As a result, the illustrative embodiments can provide more information in the search query for an information retrieval system to return more accurate results.

Figure 1:
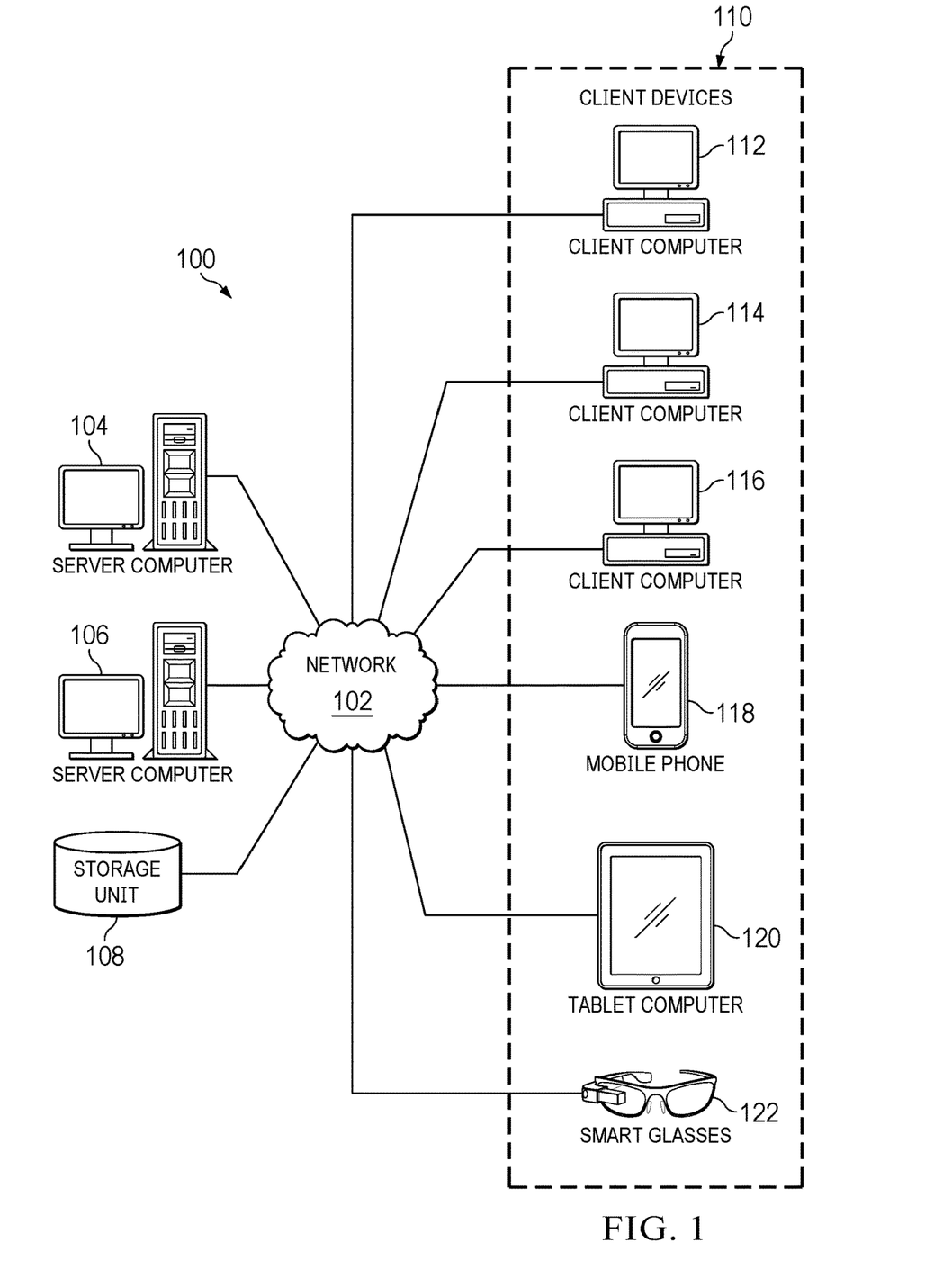
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In this illustrative example, storage unit 108 can be a centralized storage for network 102 that is independent of client devices in client devices 110. In another illustrative example, information can be stored and distributed manner in client devices 110, server computer 104, and server computer 106.

In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102. Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
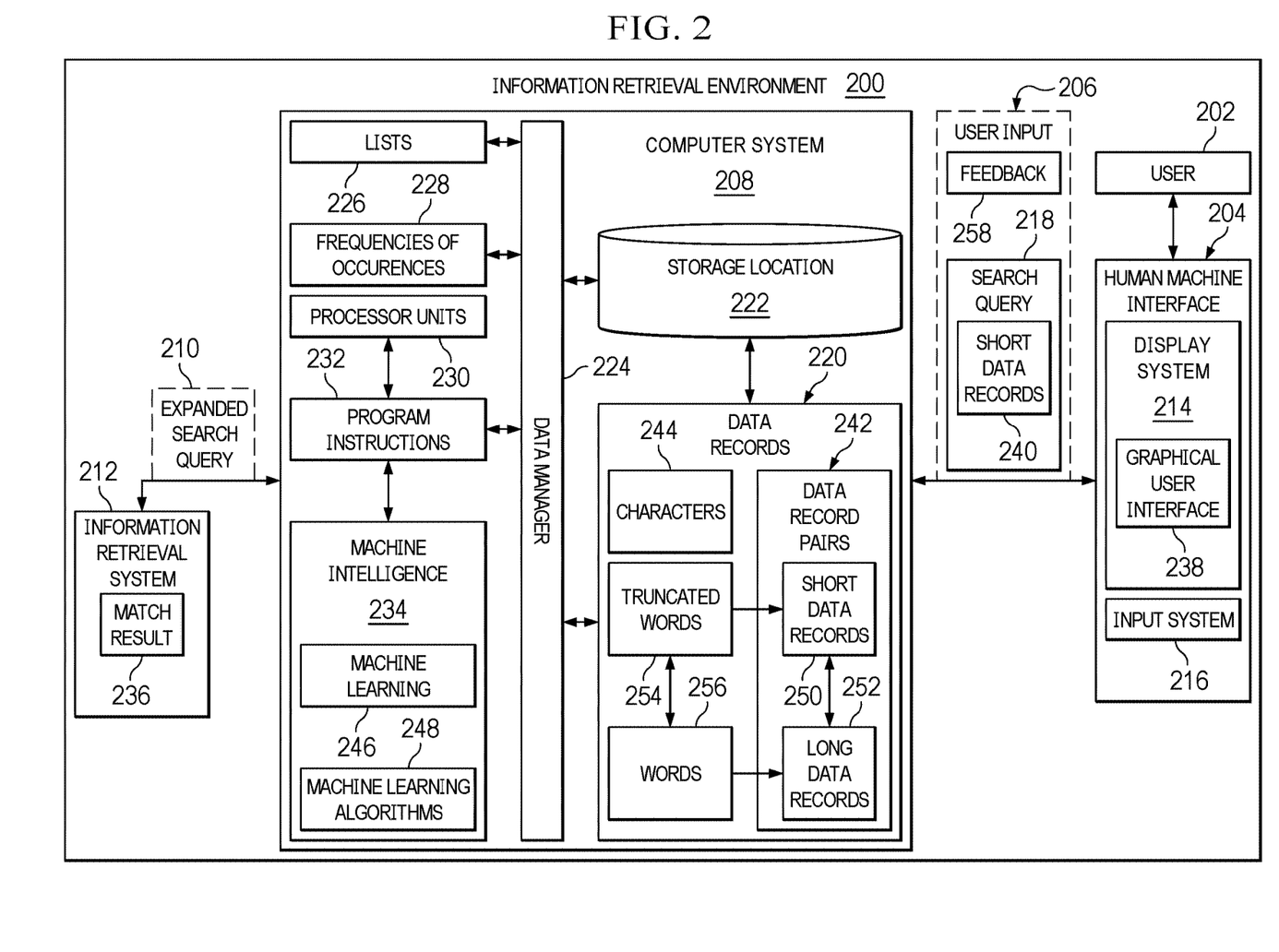
FIG. 2 is a block diagram of an information retrieval environment in accordance with an illustrative embodiment.

With reference now to FIG. 2, a block diagram of an information retrieval environment is depicted in accordance with an illustrative embodiment. In this illustrative example, information retrieval environment 200 includes components that can be implemented in hardware such as the hardware shown in network data processing system 100 in FIG. 1.

In this illustrative example, information retrieval environment 200 includes computer system 208 that can be used to manage data records for an information retrieval system. In this illustrative example, computer system 208 is comprised of a number of different components. As depicted, computer system 208 includes data manager 224.

Data manager 224 can be implemented in software, hardware, firmware, or a combination thereof. When software is used, the operations performed by data manager 224 can be implemented in program instructions configured to run on hardware, such as a processor unit. When firmware is used, the operations performed by data manager 224 can be implemented in program instructions and data and stored in persistent memory to run on a processor unit. When hardware is employed, the hardware can include circuits that operate to perform the operations in data manager 224.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

As depicted, computer system 208 includes a number of processor units 230 that are capable of executing program instructions 232 implementing processes in the illustrative examples. In other words, program instructions 232 are computer readable program instructions.

As used herein, a processor unit in the number of processor units 230 is a hardware device and is comprised of hardware circuits such as those on an integrated circuit that respond to and process instructions and program instructions that operate a computer. When the number of processor units 230 executes program instructions 232 for a process, the number of processor units 230 can be one or more processor units that are in the same computer or in different computers. In other words, the process can be distributed between processor units 230 on the same or different computers in computer system 208.

Further, the number of processor units 230 can be of the same type or different type of processor units. For example, the number of processor units 230 can be selected from at least one of a single core processor, a dual-core processor, a multi-processor core, a general-purpose central processing unit (CPU), a graphics processing unit (GPU), a digital signal processor (DSP), or some other type of processor unit.

Computer system 208 further includes machine intelligence 234. Machine intelligence 234 comprises machine learning 246 and machine learning algorithms 248. Machine learning 246 is a branch of artificial intelligence (AI) that enables computers to detect patterns and improve performance without direct programming commands. Rather than relying on direct input commands to complete a task, machine learning 246 relies on input data. The data is fed into the machine, one of machine learning algorithms 248 is selected, parameters for the data are configured, and the machine is instructed to find patterns in the input data through optimization algorithms. The data model formed from analyzing the data is then used to predict future values. In this illustrative example, the learning of the data manager 224 can be achieved through a database input that is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching for the data manager 224.

Machine intelligence 234 can be implemented using one or more systems such as an artificial intelligence system, a neural network, a Bayesian network, an expert system, a fuzzy logic system, a genetic algorithm, or other suitable types of systems. Machine learning 246 and machine learning algorithms 248 may make computer system 208 a special purpose computer for dynamic predictive modelling for processing data records.

Machine learning 246 involves using machine learning algorithms 248 to build machine learning models based on samples of data. The samples of data used for training referred to as training data or training datasets. Machine learning models trained using training datasets and make predictions without being explicitly programmed to make these predictions. Machine learning models can be trained and retrained for a number of different types of applications. These applications include, for example, medicine, healthcare, speech recognition, computer vision, or other types of applications.

Machine learning algorithms 248 can include supervised machine learning algorithms and unsupervised machine learning algorithms. Supervised machine learning can train machine learning models using data containing both the inputs and desired outputs. Examples of machine learning algorithms include XGBoost, K-means clustering, and random forest.

In computer system 208, data manager 224 receives data records 220 from a storage location 222. Storage location 222 can be any data store, database, or other type of storage. Each data record in data records 220 includes a sequence of characters 244 for phrases. For example, the phrases can be a company name, a legal destination, a truncation, an abbreviation, an idiom, or a group of any characters.

In this illustrative example, data records in data records 220 may form data record pairs in data record pairs 242. Data record pairs 242 include short data records 250 and long data records 252. In this example, short data records 250 can be abbreviations for words or truncations for words, and long data records 252 includes words that matches short data records 250. In this illustrative example, truncation means simply removes the ending portion of the word. For example, the truncation of "International" can be "Inter".

In this illustrative example, each data record pair in data record pairs 242 includes a short data record from short data records 250 and a long data record from long data records 252 that matches the short data record in each data record pair. Short data records 250 and long data records 252 both have a number of characters from characters 244. In this illustrative example, the short data record has fewer characters compared to the long data record in each data record pair.

For example, a data record pair in data record pairs 242 can include a short data record of "inves" and a long data record of "investment". In an alternative example, a data record pair in data record pairs 242 can include a short data record of "NY" and a long data record of "New York".

Data record pairs 242 can include short data records and long data records that are already pairs of data record when data manager 224 receives data records 220 from storage location 222. In one illustrative example, data record pairs can be manually added to data record pairs 242. In another illustrative example, data manager 224 can identify data record pair from data records 220 to be included in data record pairs 242. In some illustrative examples, data manager 224 can identify data record pairs from data records 220 across different languages.

Data manager 224 can identify data record pairs based on common characters shared by data records in data records 220. In this illustrative example, data manager 224 can first remove the legal designations for names in data records from data records 220 when identifying data record pairs from data records 220. In this example, legal designations for names are used to indicate types of business entities. For example, legal designations for names can be "LLC," "LLP", "LP", "GmbH", "PC", "Inc", or any legal designations that can be used indicate type of business entities.

In this illustrative example, data manager 224 can identify a word and plural for the word from data records 220 as a data record pair to be included in data record pairs 242. For example, a word of "apple" and a word of "apples" can be identified as a data record pair in data record pairs 242 with "apple" to be short data record and "apples" to be long data record.

In another example, data manager 224 can identify a word and the word's space words from data records 220 as a data record pair to be included in data record pairs 242. For example, a word of "healthcare" and a word of "health care" can be identified as a data record pair in data record pairs 242 with "healthcare" to be short data record and "health care" to be long data record.

In yet another example, data manager 224 can identify a phrase and acronym for the phrase from data records 220 as a data record pair to be included from data record pairs 242. For example, a phrase of "federal deposit insurance corp" and acronym of "fdic" can be identified as a data record pair in data record pairs 242 with "federal deposit insurance corp" to be long data record and "fdic" to be short data record.

In yet another example, data manager 224 can identify a word from words 256 and an abbreviation for the word as a data record pair to be included in data record pairs 242. In this example, the word from words 256 is a long data record in a data record pair, and abbreviation for the word is a short data record in the data record pair. In this illustrative example, a word and an abbreviation for the word cannot have the same number of characters. In addition, the word and an abbreviation for the word have the same first characters and at least one other common character in the same order.

For example, "frog" cannot be the abbreviation for "bank" because "frog" and "bank" have the same number of characters and do not have the same first characters. In contrast, "bk" is abbreviation for "bank" because "bank" and "bk" both have "b" as the first character and "k" as a common character that listed after first letter "b." In this example, the abbreviation for the word has a strict subset of characters when compared to the word. In other words, data manager 224 iterates through all characters of the word to determine if the same characters can be found in the abbreviation for the word in same order. For example, "bxk" is not an abbreviation for "bank" because character "x" does not match any characters in "bank". In another example, "kb" is not an abbreviation for "bank" because character "k" and character "b" in "bank" and "kb" are in a different order.

In yet another example, data manager 224 can identify street abbreviations, state abbreviations, and country abbreviations from data records 220 for identifying data record pairs to be included in data record pairs 242. For example, street abbreviations such as "ave", "blvd", "cir", "ct", "dr", "mt", "pt", "rd", and "st" can form data record pairs with "avenue", "boulevard", "circle", "court", "drive", "mount", "point", "road", and "street" respectively. In another example, state abbreviations such as "TX", "CA", "NY" can form data record pairs with "Texas", "California", and "New York" respectively. In yet another example, country abbreviations such as "US", "CN", "JP", "DE" form data record pairs with "United States", "China", "Japan", and "Germany" respectively.

In yet another example, data manager 224 can identify a word from words 256 and a truncated word from truncated words 254 as a data record pair to be included in data record pairs 242. In this illustrative example, words 256 are words from data records in data records 220 and truncated words 254 are generated by truncating words 254.

For example, a word "testing123" from words 256 can be truncated into a number of truncated words with at least two characters. In this example, "testing123" can be truncated into truncated words of different lengths. For example, "testing123" can be truncated into "testing12", "testing1", "testing", "testin", "testi", "test", "tes", and "the". In this example, the truncated words for "testing123" become short data records in short data records 250, and word "testing123" becomes a long data record in long data records 252. The truncated words for "testing123" and word "testing123" form data record pairs to be included in data record pairs 242.

In one illustrative example, data manager 224 can include a clean function to remove a portion of words 256. For example, functions words such as "an", "are", "but", "by", and "for", "if", "into", "not", "of", "such", "that", "the", "their", "then", "there", "these", "they", "this", "to", "was", and "with" can be removed from words 256.

In another example, the clean function can further be used to remove words that occur less in data records 220. Data manager 224 can remove words that occur less than a predefined threshold. The predefined threshold can be the number of times that a word occurs in data records 220. For example, the predefined threshold can be 10 times, 15 times, or 20 times.

In this illustrative example, data manager 224 determines frequencies of occurrences 228 for data record pairs 242. In this example, frequencies of occurrences 228 can include a frequency for each short data record in short data records 250 indicating how many times each short data record in short data records 250 is associated with a long data record in long data records 252.

In addition, frequencies of occurrences 228 can include a frequency for each long data record in long data records 252 indicating how many times each long data record in long data records 252 is associated with a short data record in short data records 250.

In this illustrative example, data manager 224 generates lists 226 by using frequencies of occurrences 228. In this example, lists 226 includes lists of long data records that can be associated with each short data record in data record pairs 242. In other words, each list in lists 226 includes a number of long data records that are associated with a short data record in data record pairs. In this illustrative example, long data records in each list of lists 226 can be ranked using frequencies of occurrences for long data records.

For example, a list in lists 226 for short data record "ser" can be [(472993, 'services'), (154863, 'series'), (147780, 'service')]. In this illustrative example, the list for short data record "ser" indicates that long data record "services" is associated with short data record "ser" 472993 times in data record pairs 242, long data record "series" is associated with short data record "ser" 154863 times in data record pairs 242, and long data record "service" is associated with short data record "ser" 154863 times in data record pairs 242.

In an alternative example, a list in lists 226 for short data record "in" can be [(213036, 'international'), (212694, 'investment'), (139579, 'investments'), (137484, 'invest')]. In this illustrative example, the list for short data record "in" indicates that long data record "international" is associated with short data record "in" 213036 times in data record pairs 242, long data record "investment" is associated with short data record "in" 212694 times in data record pairs 242, long data record "investments" is associated with short data record "in" 139579 times in data record pairs 242, and long data record "inves" is associated with short data record "in" 137484 times in data record pairs 242.

In this illustrative example, lists 226 can be refined by utilizing a count threshold to remove long data records in each list from lists 226 that does not occur frequently. For example, a list from lists 226 for a short data record "ho" can be [(416390, 'holding'), (209364, 'holdings'), (68793, 'home'), (50787, 'house'), (46838, 'hotel'), (19, 'honey'), (5, 'horse')]. In this example, long data record "holding" is associated with short data record "ho" 416390 times in data record pairs 242.

In a similar fashion, long data records "holdings", "home", "house", "hotel", "honey", and "horse" are associated with short data record "ho" 209364 times, 68793 times, 50787 times, 46848 times, 19 times, and 5 times in data record pairs 242, respectively. In this example, a count threshold of 20 counts can be set to remove long data records in the list of short data record "ho". The associations between short data record "ho" and long data records "honey" and "horse" do not occur frequently enough because long data records "honey" and "horse" are only associated with short data record "ho" 19 times and 5 times. As a result, "honey" and "horse" can be removed from the list for short data record "ho".

In this illustrative example, computer system 208 receives a user input 206 from user 202. In this example, user input 206 can be generated by user 202 using human machine interface (HMI) 204. As depicted, human machine interface 204 comprises display system 214 and input system 216. Display system 214 is a physical hardware system and includes one or more display devices on which graphical user interface 238 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 202 is a person that can interact with graphical user interface 238 through user input 206 generated by input system 216. Input system 216 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In one illustrative example, computer system 208 can receive search query 218 in user input 206 for processing. Search query 218 includes a number of short data records 240. In this example, short data records 240 includes short data records that can be found in short data records 250 in data record pairs 242.

In this example, data manager 224 processes search query 218 by using lists 226 to identify a number of long data records that are associated with short data records in search query 218. Data manager 224 adds the number of long data records associated with short data records in search query 218. As a result, data manager 224 generates expanded search query 210 to be sent to information retrieval system 212. In this example, information retrieval system 212 can be a database, a search engine, or any tool designed to store and retrieve relevant information from a large collection of data.

Data manager 224 can display information to user 202 over human machine interface 204. For example, data manager 224 can display lists 226 with frequencies of occurrences for long data records in graphical user interface 238 on display system 214. In another illustrative example, lists 226 can be displayed without frequencies of occurrences. With this example, long data records in lists 226 can be displayed in a rank order from highest to lowest.

Additionally, data manager 224 can display expanded search query 210 in graphical user interface 238 on display system 214 in response to receive search query 218 from user input 206. Further, data manager 224 can display match result 236 in graphical user interface 238 on display system 214 after information retrieval system 212 identifies match result 236 for expanded search query 210.

In this example, user 202 can review expanded search query 210 to provide feedback to data manager 224 based on the accuracy of expanded search query 210. In other words, input of search query 218 in user input 206 can result in data manager 224 displaying long records that are identified for expanded search query 210 in graphical user interface 238.

After reviewing expanded search query 210, user 202 can provide feedback 258 through user input 206 to data manager 224 based on the accuracy of expanded search query 210. In this illustrative example, machine learning algorithms 248 in machine intelligence 234 can use feedbacks from feedback 258 received from user 202 to retrain machine learning models for identifying data record pairs 242 and long records in lists 226 for expanding search queries.

In this illustrative example, match result 236 can also be displayed in graphical user interface 238 on display system 214 in human machine interface 204.

In one illustrative example, one or more solutions are present that overcome issues with accurately return results for a search query. The use of data manager 224 can increase the accuracy in identifying data records that match search queries with ambiguous or unclear phrases. The speed and accuracy in identifying data records that can be added to search queries for an information retrieval system to efficiently return results are improved.

Computer system 208 can be configured to perform at least one of the steps, operations, or actions described in the different illustrative examples using software, hardware, firmware, or a combination thereof. As a result, computer system 208 operates as a special purpose computer system in which data manager 224 in computer system 208 enables management of search queries for an information retrieval system. In particular, data manager 224 transforms computer system 208 into a special purpose computer system as compared to currently available general computer systems that do not have data manager 224.

In the illustrative example, the use of data manager 224 in computer system 208 integrates processes into a practical application for managing search queries for an information retrieval system that increases the performance of computer system 208. In other words, data manager 224 in computer system 208 is directed to a practical application of processes integrated into data manager 224 in computer system 208 receives data records, identifies data record pairs in the data records, generates lists of long data records for each short data records in the identified data record pairs, and generates an expanded search query based using lists of long data records for each short data record in a search query received by computer system 208. The expanded search query can be used as input for an information retrieval system to return match results for the search query received by computer system 208. As a result, data manager 224 in computer system 208 increases the accuracy and efficiency in searching search query in an information retrieval system.

The illustration of information retrieval environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
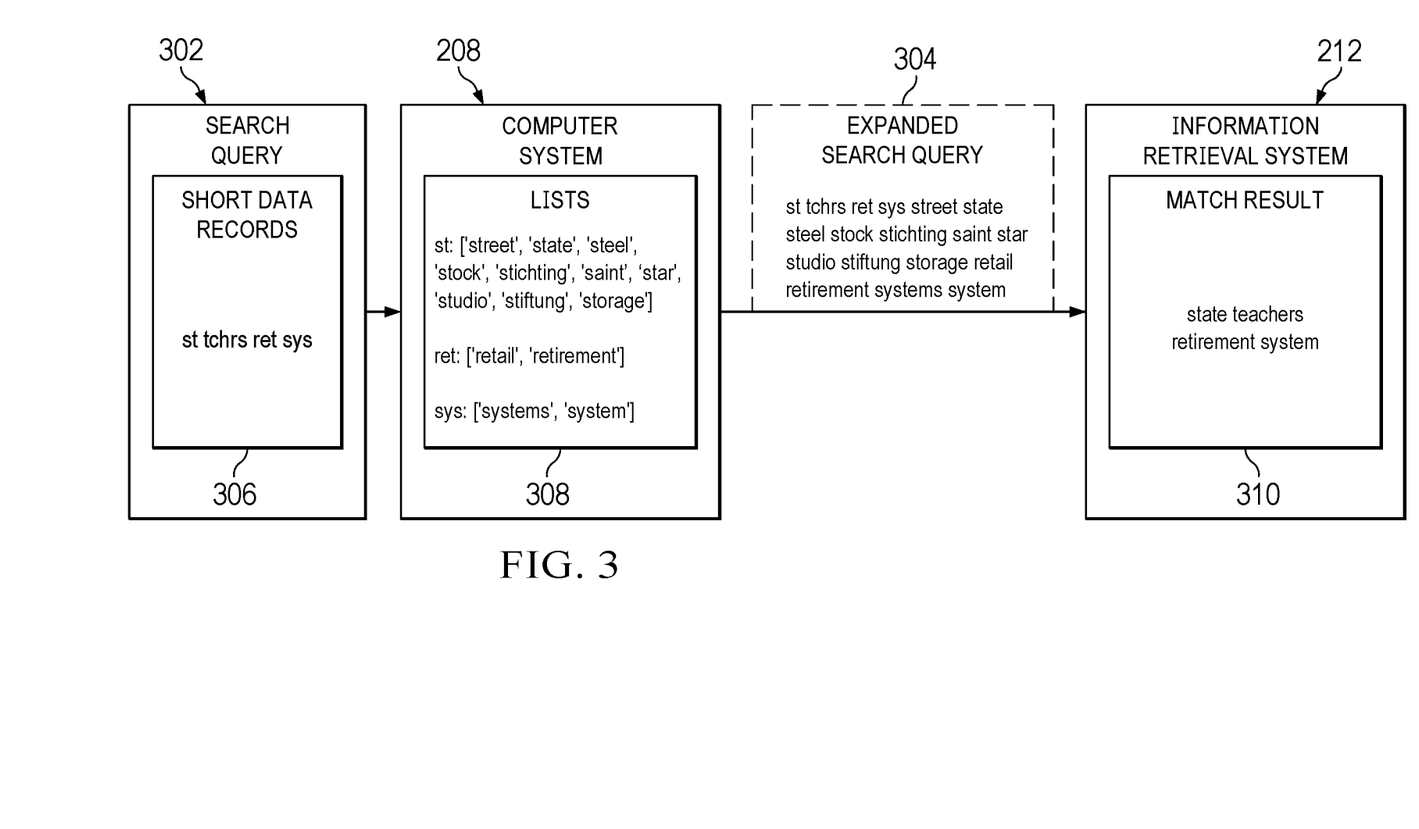
FIG. 3 is a diagram illustrating data flow of search queries for an information retrieval system in accordance with an illustrative embodiment.

FIG. 3 depicts a diagram illustrating data flow of search queries for an information retrieval system in accordance with an illustrative embodiment. FIG. 3 illustrates generation of expanded search query 210 and match result 236 in FIG. 2. In the illustrative examples, the same reference numeral may be used in more than one figure. This reuse of a reference numeral in different figures represents the same element in the different figures.

In FIG. 3, search query 302 is received by computer system 208 for processing. In this illustrative example, search query 302 includes short data records 306 that includes phrases that a user intended to search. For example, short data records 306 can include short data records of "st", "tchrs", "ret", and "sys" for a company name. In this example, search query 302 can be an example of search query 218 and short data records 306 can be an example of short data records 240 in FIG. 2.

Lists 308 is identified in computer system 208 for short data records 306. In this example, lists 308 includes a list of long records for each short data record in short data records 306. For example, a list of ["street", "state", "steel", "stock", "stitching", "saint", "star", "studio", "stiftung", "storage"] is identified for short data record "st", a list of ["retail", "retirement"] is identified for short data record "ret", and a list of ["systems", "system"] is identified for short data record "sys". No list is identified for short data record "tchrs" because short data record "tchrs" does not have list stored in computer system 208. In this example, lists 308 can be a portion of lists 226 in FIG. 2.

In this illustrative example, expanded search query 304 is generated by expanding search query 302 using lists 308. As a result, expanded search query 304 becomes "st tchrs ret sys street state steel stock stitching saint star studio stiftung storage retail retirement systems system". In this example, expanded search query 304 is the combination of short data records in short data records 306 and long data records in lists 308.

Expanded search query 304 is sent to information retrieval system 212 for processing. In this illustrative example, information retrieval system 212 uses short data records and long data records in expanded search query 304 as keywords to identify match result 310 that corresponds to expanded search query 304. In this example, match result 310 that includes a name of "state teachers retirement system" is returned as most likely match for expanded search query 304. In another example, match result 310 can include multiple matches that can be displayed for selection.

Figure 4:
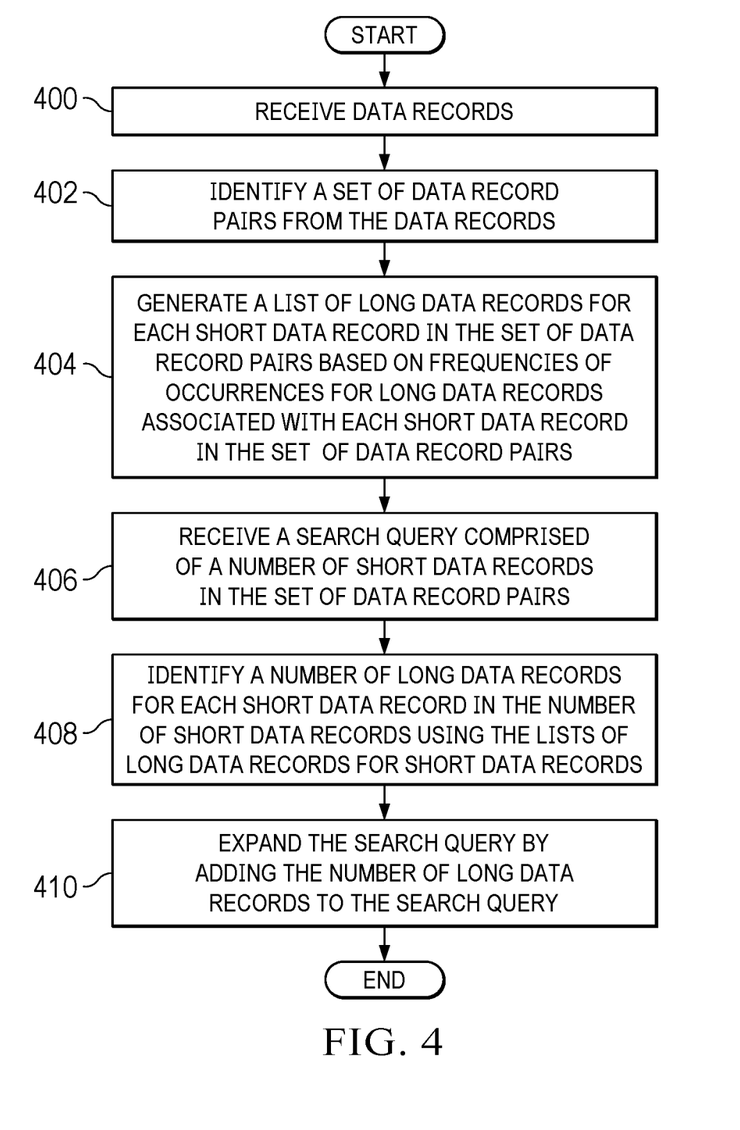
FIG. 4 is a flowchart for a process for managing search query in accordance with an illustrative embodiment.

In FIG. 4, a flowchart of a process for managing search query is depicted in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in data manager 224 in computer system 208 in FIG. 2.

In this illustrative example, the process begins by receiving data records (step 400). In step 400, each data record in the data records comprises a sequence of characters for a phrase. In this example, the phrase can be a group of words. As depicted, the phrase can be a name, a description of an object, or an idiom.

The process identifies a set of data record pairs from the data records (step 402). In step 402, each data record pair in the set of data record pairs includes a long data record and a short data record. In this example, the short data record and the long data record in each data record pair share a number of common characters. In addition, the long data record has more characters than the short data record in each data record pair.

The process generates a list of long data records for each short data record in the set of data record pairs based on frequencies of occurrences for long data records associated with each short data record in the set of data record pairs (step 404).

The process receives a search query comprised of a number of short data records in the set of data record pairs (step 406). The process identifies a number of long data records for each short data record in the number of short data records using the lists of long data records for short data records (step 408).

The process expands the search query by adding the number of long data records to the search query (step 410). The process terminates thereafter.

Figure 5:
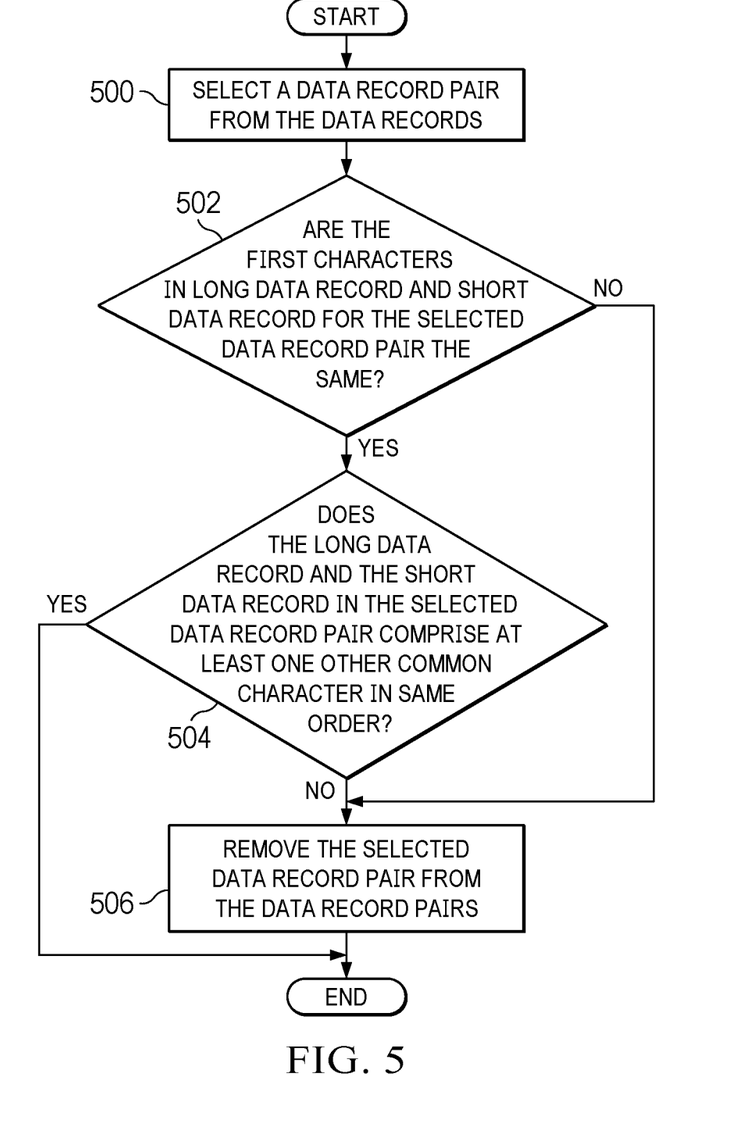
FIG. 5 is a flowchart of a process for identifying words and abbreviations for the words as data record pairs in accordance with an illustrative embodiment.

Turning next to FIG. 5, a flowchart of a process for identifying words and abbreviations for the words as data record pairs is depicted in accordance with an illustrative embodiment. The process in FIG. 5 is an example of an implementation for step 402 in FIG. 4.

The process begins by selecting a data record pair from the data records (step 500). The process determines whether the first characters in long data record and short data record for the selected data record pair are the same (step 502). In this illustrative example, the process considers uppercase and lowercase of a character to be the same character.

If first characters in long data record and short data record for the selected data record pair are the same, the process proceeds to determine whether the long data record and the short data record in the selected data record pair comprise at least one other common character in same order (step 504).

In step 504, the process determines whether the short data record in the selected data record pair has a strict subset of characters when compared to the long data record in the selected data record pair. In other words, the process iterates through all characters of the long data records in the selected data record pair to determine if the same characters can be found in the short data records in the selected data record pair in the same order. If the long data record and the short data record in the selected data record pair comprise at least one other character in same order, the process terminates thereafter.

With reference again to step 504, if the long data record and the short data record in the selected data record pair do not comprise at least one other common character in same order, the process removes the selected data record pair from data record pairs from the data records (step 506). The process terminates thereafter.

With reference again to step 502, if the first characters in the long data record and the short data record for the selected data record pair are not same, the process also proceeds to step 506. The process terminates thereafter.

Figure 6:
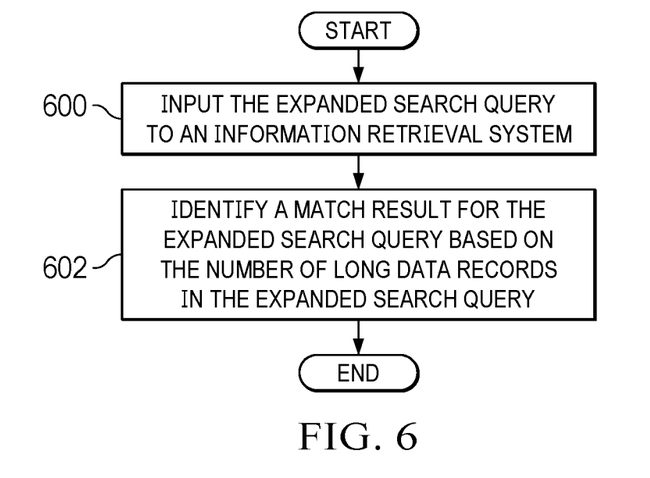
FIG. 6 is a flowchart of a process for identifying match results for search queries in accordance with an illustrative embodiment.

With reference to FIG. 6, a flowchart of a process for identifying match results for search queries is depicted in accordance with an illustrative embodiment. The process depicted in this figure is an example of an additional step that can be performed with the steps in FIG. 4.

The process begins by inputting the expanded search query to an information retrieval system (step 600). As depicted, the information retrieval system can be a search engine, a database, or any system that facilitates the searching, retrieval, and organization of information from different sources.

The process identifies a match result for the expanded search query based on the number of long data records in the expanded search query (step 602). The process terminates thereafter.

Figure 7:
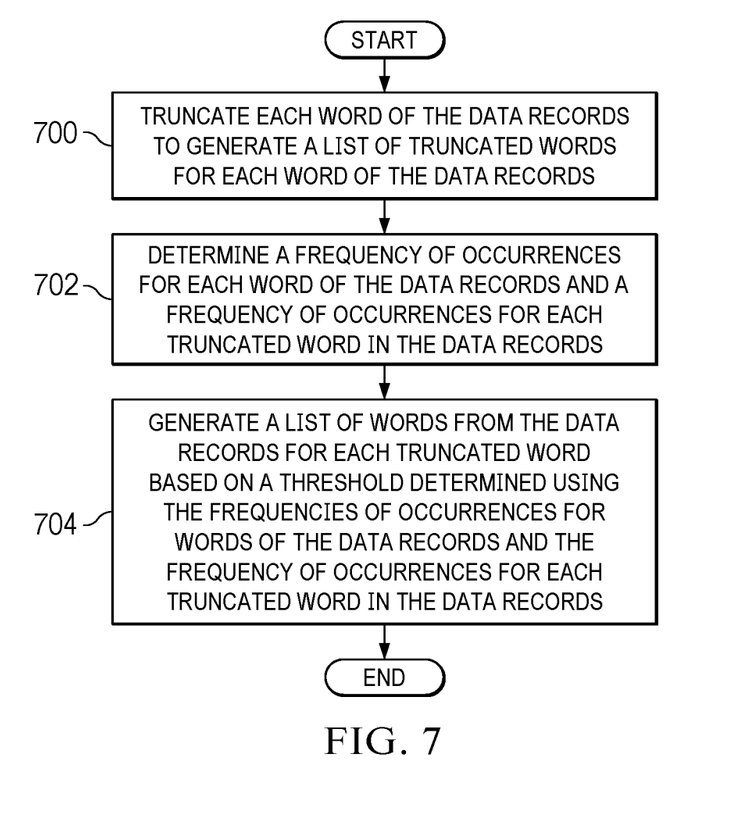
FIG. 7 is a flowchart of a process for generating lists of long data records for short data records in accordance with an illustrative embodiment.

Turning next to FIG. 7, a flowchart of a process for generating lists of long data records for short data records is depicted in accordance with an illustrative embodiment. The process in FIG. 5 is an example of an implementation for step 408 in FIG. 4.

The process begins by truncating each word of the data records to generate a list of truncated words for each word of the data records (step 700).

The process determines a frequency of occurrences for each word of the data records and a frequency of occurrences for each truncated word in the data records (step 702). The process generates a list of words from the data records for each truncated word based on a threshold determined using the frequencies of occurrences for words of the data records and the frequency of occurrences for each truncated word in the data records (step 704). The process terminates thereafter. In step 704, the process can optionally compare the frequency of occurrences of each word to the frequencies of occurrences of truncated words for each word. In this illustrative example, the process can remove words from a list of words for a truncated word if frequencies of occurrences for the words is higher than the frequency of occurrences for the truncated word.

Figure 8:
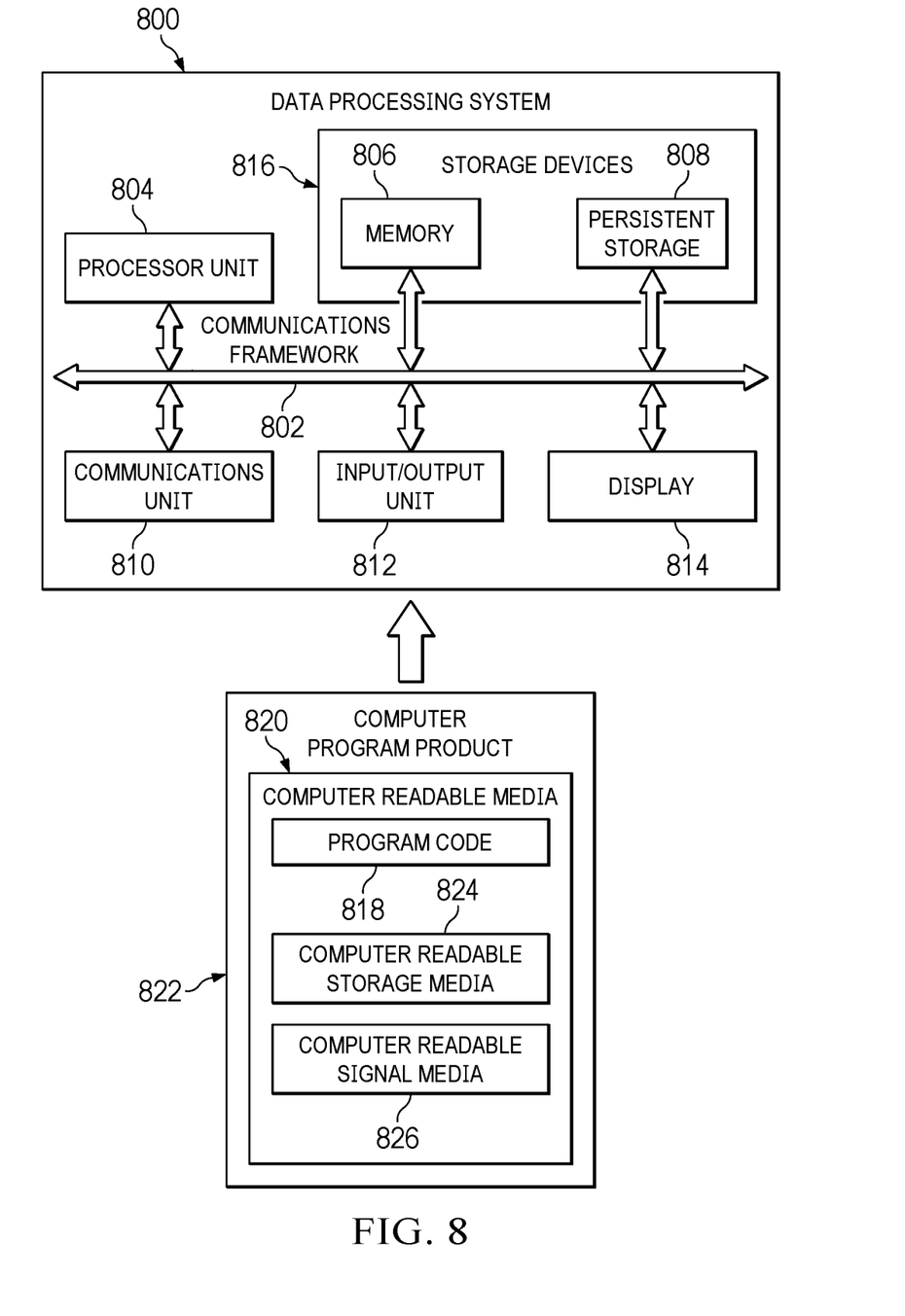
FIG. 8 is a block diagram of a data processing system in accordance with an illustrative embodiment.

Turning now to FIG. 8, an illustration of a block diagram of a data processing system is depicted in accordance with an illustrative embodiment. Data processing system 800 may be used to implement server computer 104 and 106 and client devices 110 in FIG. 1, as well as computer system 208 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (GPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer readable signal media 826. Computer readable signal media 826 may be, for example, a propagated data signal containing program code 818. For example, computer readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component with an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for managing search queries, comprising:
   receiving, by a number of processor units, data records, wherein each data record in the data records comprises a sequence of characters for a phrase;
   identifying, by the number of processor units, a set of data record pairs from the data records, wherein each data record pair in the set of data record pairs comprises a long data record and a short data record that share a number of common characters with the long data record, and wherein the long data record comprises more characters than the short data record;
   generating, by the number of processor units, a list of long data records for each short data record in the set of data record pairs based on frequencies of occurrences for long data records associated with each short data record in the set of data record pairs;
   receiving, by the number of processor units, a search query comprising a number of short data records in the set of data record pairs;
   identifying, by the number of processor units, a number of long data records for each short data record in the number of short data records using the lists of long data records for short data records; and
   expanding, by the number of processor units, the search query by adding the number of long data records to the search query.

2. The computer implemented method of claim 1, wherein identifying, by the number of processor units, a set of the data record pairs, wherein each data record pair in the set of data record pairs comprises a long data record and a short data record that share a number of common characters with the long data record, and wherein the long data record comprises more characters than the short data record further comprises:
   determining, by the number of processor units, whether first characters in the long data record and the short data record for each data record pair are the same; and
   in responsive to determining that the first characters in the long data record and the short data record for a data record pair are the same, determining, by the number of processor units, whether the long data record and the short data record in the data record pair comprise at least one other common character in the same order.

3. The computer implemented method of claim 1, further comprising:
inputting, by the number of processor units, the expanded search query to an information retrieval system; and
identifying, by the number of processor units, a match result for the expanded search query based on the number of long data records and the number of short data records in the expanded search query.

4. The computer implemented method of claim 1, wherein generating, by the number of processor units, a list of long data records for each short data record in the set of data record pairs based on frequencies of occurrences for long data records associated with each short data record in the set of data record pairs further comprises:
truncating, by the number of processor units, each word of the data records to generate a list of truncated words for each word of the data records, wherein a word of the data records and a truncated word associated with the word of the data records form a data record pair in the set of data record pairs;
determining, by the number of processor units, a frequency of occurrences for each word of the data records and a frequency of occurrences for each truncated word in the data records; and
generating, by the number of processor units, a list of words from the data records for each truncated word based on a threshold determined according to the frequencies of occurrences for words of the data records and the frequency of occurrences for each truncated word in the data records.

5. The computer implemented method of claim 1, wherein data records in the number of data record pairs comprise sequence of characters for phrases in different languages.

6. The computer implemented method of claim 1, wherein data record pairs in the set of data record pairs comprise long data records that are plurals of short data records.

7. The computer implemented method of claim 1, wherein data record pairs in the set of data record pairs comprise short data records that are acronyms of long data records.

8. The computer implemented method of claim 1, wherein data record pairs in the set of data record pairs comprise long data records that are spaced names of long data records.

9. The computer implemented method of claim 1, wherein data record pairs in the set of data record pairs comprise abbreviations for countries, abbreviations for states and provinces, and abbreviations for addresses.

10. A computer system comprising:
a number of processor units, wherein the number of processor units executes program instructions to:
receive data records, wherein each data record in the data records comprises a sequence of characters for a phrase;
identify a set of data record pairs from the data records, wherein each data record pair in the set of data record pairs comprises a long data record and a short data record that share a number of common characters with the long data record, and wherein the long data record comprises more characters than the short data record;
generate a list of long data records for each short data record in the set of data record pairs based on frequencies of occurrences for long data records associated with each short data record in the set of data record pairs;
receive a search query comprises a number of short data records in the set of data record pairs;
identify a number of long data records for each short data record in the number of short data records using the lists of long data records for short data records; and
expand the search query by adding the number of long data records to the search query.

11. The computer system of claim 10, wherein identifying a set of the data record pairs, the number of processor units further executes program instructions to:
determine whether first characters in the long data record and the short data record for each data record pair is same; and
in responsive to determining that the first characters in the long data record and the short data record for a data record pair is same, determine whether the long data record and the short data record in the data record pair comprise at least one other common character in same order.

12. The computer system of claim 10, further comprising:
input the expanded search query to an information retrieval system; and
identify a match result for the expanded search query based on the number of long data records and the number of short data records in the expanded search query.

13. The computer system of claim 10, wherein generate a list of long data records for each short data record in the set of data record pairs further comprises:
truncate each word of the data records to generate a list of truncated words for each word of the data records, wherein a word of the data records and a truncated word associated with the word of the data records form a data record pair in the set of data record pairs;
determine a frequency of occurrences for each word of the data records and a frequency of occurrences for each truncated word in the data records; and
generate a list of words from the data records for each truncated word based on a threshold determined using the frequencies of occurrences for words of the data records and the frequency of occurrences for each truncated word in the data records.

14. The computer system of claim 10, wherein data records in the number of data record pairs comprise sequence of characters for names in different languages.

15. The computer system of claim 11, wherein data record pairs in the set of data record pairs comprise long data records that are plurals of short data records.

16. The computer system of claim 11, wherein data record pairs in the set of data record pairs comprise short data records that are acronyms of long data records.

17. The computer system of claim 11, wherein data record pairs in the set of data record pairs comprise long data records that are spaced names of long data records.

18. The computer system of claim 11, wherein data record pairs in the set of data record pairs comprise abbreviations for countries, abbreviations for states and provinces, and abbreviations for addresses.

19. A computer program product for managing search queries, the computer program product comprising a computer readable storage medium having program instructions embodied therewith, the program instructions executable by a computer system to cause the computer system to:
receive data records, wherein each data record in the data records comprises a sequence of characters for a name;
identify a set of data record pairs from the data records, wherein each data record pair in the set of data record pairs comprises a long data record and a short data record that share a number of common characters with the long data record, and wherein the long data record comprises more characters than the short data record;

generate a list of long data records for each short data record in the set of data record pairs based on frequencies of occurrences for long data records associated with each short data record in the set of data record pairs;

receive a search query comprises a number of short data records in the set of data record pairs;

identify a number of long data records for each short data record in the number of short data records using the lists of long data records for short data records; and expand the search query by adding the number of long data records to the search query.

20. The computer program product of claim 19, wherein identify a set of the data record pairs, the program instructions executable by the computer system further cause the computer system to:

determine whether first characters in the long data record and the short data record for each data record pair is same; and in responsive to determining that the first characters in the long data record and the short data record for a data record pair is same, determine whether the long data record and the short data record in the data record pair comprise at least one other common character in same order.

21. The computer program product of claim 19, further comprising:

input the expanded search query to an information retrieval system; and identify a match result for the expanded search query based on the number of long data records and the number of short data records in the expanded search query.

22. The computer program product of claim 19, wherein generate a list of long data records for each short data record in the set of data record pairs further comprises:

truncate each word of the data records to generate a list of truncated words for each word of the data records, wherein a word of the data records and a truncated word associated with the word of the data records form a data record pair in the set of data record pairs;

determine a frequency of occurrences for each word of the data records and a frequency of occurrences for each truncated word in the data records; and generate a list of words from the data records for each truncated word based on a threshold determined using the frequencies of occurrences for words of the data records and the frequency of occurrences for each truncated word in the data records.

23. The computer program product of claim 19, wherein data records in the number of data record pairs comprise sequence of characters for names in different languages.

24. The computer program product of claim 19, wherein data record pairs in the set of data record pairs comprise long data records that are plurals of short data records.

25. The computer program product of claim 19, wherein data record pairs in the set of data record pairs comprise short data records that are acronyms of long data records.

26. The computer program product of claim 19, wherein data record pairs in the set of data record pairs comprise long data records that are spaced names of long data records.

27. The computer program product of claim 19, wherein data record pairs in the set of data record pairs comprise abbreviations for countries, abbreviations for states and provinces, and abbreviations for addresses.

* * * * *